(Model.)
W. H. CLAY.
ANCHOR STAKE FOR CHECK ROW WIRES.
No. 310,384. Patented Jan. 6, 1885.
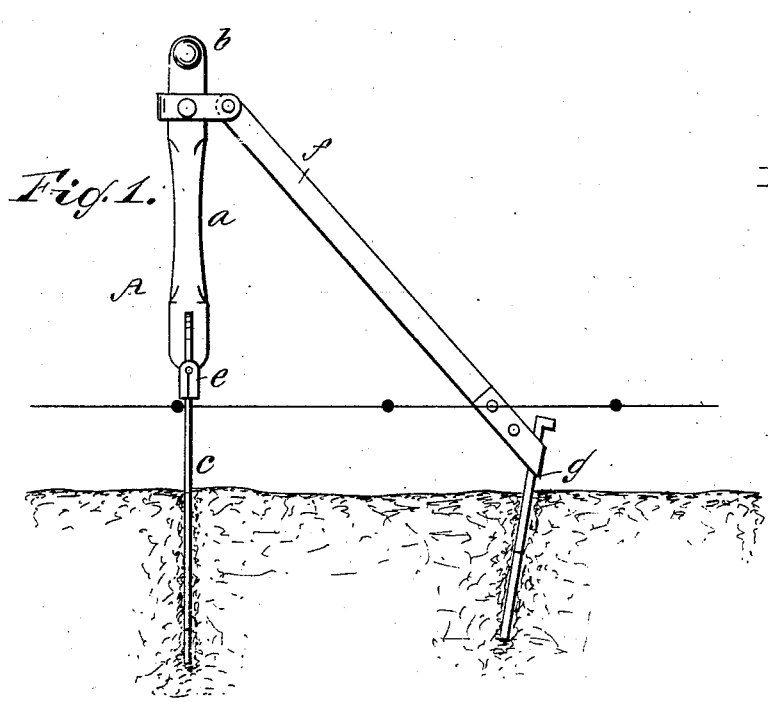
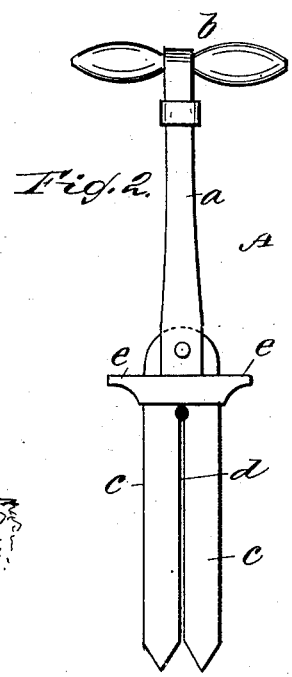
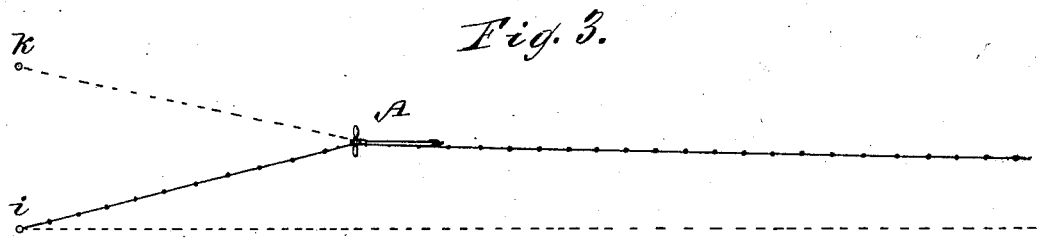
WITNESSES:
INVENTOR:
W. H. Clay
BY Munn & Co
ATTORNEYS.

UNITED STATES PATENT OFFICE.

WILLIAM H. CLAY, OF PARIS, KENTUCKY.

ANCHOR-STAKE FOR CHECK-ROW WIRES.

SPECIFICATION forming part of Letters Patent No. 310,384, dated January 6, 1885.

Application filed September 27, 1884. (Model.)

*To all whom it may concern:*

Be it known that I, WILLIAM H. CLAY, of Paris, in the county of Bourbon and State of Kentucky, have invented a new and Improved Anchor-Stake for Check-Row Wires, of which the following is a full, clear, and exact description.

In planting corn with a machine provided with a check-rower the wire is anchored at the ends of the field, and the anchors are shifted as the planter reaches the ends of rows, so that the machine can be turned and started on a new row. In this shifting of the wire it is almost impossible to reset the anchor so as to give the wire the same tension as before, especially when the field is a long one, and the result is usually that the rows are not planted correctly.

To obviate that difficulty is the object of my invention; and it consists in a method of anchoring the check-row wire before it is loosened from the machine and main anchor, and also in an anchor-stake of novel construction, as hereinafter described and claimed.

Reference is to be had to the accompanying drawings, forming a part of this specification, in which similar letters of reference indicate corresponding parts in all the figures.

Figure 1 is a side elevation of my improved anchor-stake, showing the same as applied to use. Fig. 2 is a face view of the stake, and Fig. 3 is a diagram illustrating the method of use.

The anchor-stake A consists of a straight shank portion, $a$, fitted at its upper end with a cross-handle, $b$, and carrying at its lower end a blade, $c$, that is formed with a lengthwise slot, $d$, extending from near the shank to the outer end of the blade. The slot is just wide enough to pass freely over the wire. At the base of the blade is a rigid cross-piece projecting at each side, so as to form foot-rests $e$, for use in pressing the blade into the ground. At the top of stake A a brace, $f$, is attached by a joint. The outer end of the brace has a hole for a pin, $g$, which is to be driven into the ground to fasten the end of the brace. When the stake is placed over the check-row wire next to one of the knobs, the blade forced in the ground, and the brace $f$ also fastened, the wire is securely anchored.

The use of a stake with a planter is illustrated in Fig. 3. Supposing $i$ to represent the anchor or fastening of the wire at the end of a row, when the planter reaches that point the stake A is to be placed, as shown, at a point half-way between the points $i$ and $k$ and a short distance from the end and behind the planter. Thus placed the stake will hold the main portion of the wire stretched while its end is carried to and anchored at $k$ and the machine turned around. Then stake A being removed, the wire has the same tension as before, and consequently the planting will be correctly done.

Having thus described my invention, I claim as new and desire to secure by Letters Patent—

1. The anchor-stake having the blade provided with a longitudinal slot, forming the blade with two prongs, to permit the stake to be placed bodily astride of the check-row wire, substantially as and for the purpose set forth.

2. In an anchor-stake, the shank having the longitudinally-slotted blade and the foot cross-piece disposed at the base of said shank and the upper end of said blade, substantially as and for the purpose set forth.

3. In an anchor-stake, the shank having the longitudinally-slotted blade and the foot cross-piece, in combination with the brace connected to said shank and receiving through its lower end a pin, substantially as and for the purpose set forth.

WILLIAM H. CLAY.

Witnesses:
F. P. CLAY, Sr.,
F. P. CLAY, Jr.